United States Patent [19]

Van Wijk et al.

[11] Patent Number: 4,913,818

[45] Date of Patent: Apr. 3, 1990

[54] METHOD AND MEMBRANE FOR THE REMOVAL OF WATER VAPOR FROM A GAS/VAPOR MIXTURE BY MEANS OF VAPOR PERMEATION

[75] Inventors: Hendrik F. Van Wijk, Zeist; Albert E. Jansen, Nieuwegein, both of Netherlands

[73] Assignee: Nederlandse Organisatie voor Toegepast-Natuurwetenschappelijk Onderzoek TNO, The Hague, Netherlands

[21] Appl. No.: 242,711

[22] Filed: Sep. 9, 1988

[30] Foreign Application Priority Data

Sep. 9, 1987 [NL] Netherlands .......................... 8702150

[51] Int. Cl.$^4$ ............................................ B01D 13/00
[52] U.S. Cl. .................................. 210/500.27; 55/16; 55/68; 55/158; 210/502.1
[58] Field of Search ............................ 55/16, 68, 158; 210/500.21, 500.25, 500.27, 500.1

[56] References Cited

U.S. PATENT DOCUMENTS 4,710,205  12/1987  Deetz et al. ............................. 55/16

Primary Examiner—Frank Sever
Attorney, Agent, or Firm—William H. Elliott, Jr.; Richard L. Hansen

[57] ABSTRACT

The removal of water vapor from a gas/vapor mixture by means of vapor permeation takes place by passing the mixture to be separated along one side of a membrane and the permeation of water vapor through the membrane is achieved by maintaining a relatively low partial pressure of water vapor on the other side of the membrane. To increase the flux the membrane is impregnated beforehand with a hygroscopic electrolyte.

3 Claims, No Drawings

METHOD AND MEMBRANE FOR THE REMOVAL OF WATER VAPOR FROM A GAS/VAPOR MIXTURE BY MEANS OF VAPOR PERMEATION

The invention relates in the first instance to a method for the removal of water vapour from a gas/vapour mixture by means of vapour permeation, in which method the mixture to be separated is passed along one side of a membrane and permeation of water vapour through the membrane is achieved by maintaining a lower partial pressure of water vapour on the other side of the membrane.

It is known that the water is selectively evaporated through a membrane to remove water from an organic liquid. This method, which is known under the name of pervaporation, is used for dehydrating so-called azeotropic mixtures of alcohols and water, in which method a liquid mixture is passed at atmospheric pressure along a membrane and a low pressure is applied to the other side of said membrane or an inert gas is passed along it. The membrane has a structure and composition such that virtually only water is able to pass through the membrane. The transport of water through the membrane takes place because the partial water vapour pressure on the permeate side of the membrane is kept below the partial water vapour pressure of the liquid mixture. The most important drawback of pervaporation is that it is an evaporation process so that the heat of evaporation of the water to be removed has to be supplied or, if that is impossible, has to be removed from the mixture by a drop in the working temperature. Supplying heat to a membrane module cannot be carried out satisfactorily from a technical and economic point of view. In practice, the problem is solved by carrying out the dehydration in a number of steps. Use is made of a number of modules, the liquid mixture being heated up again to the desired working temperature between each of the modules.

The drawbacks of this fairly complicated method can be avoided by using vapour permeation. In this case, the mixture to be separated is passed in vapour form along the membrane at a temperature which is somewhat above the boiling point at atmospheric pressure. No heat of evaporation is, of course, necessary for this selective permeation of a component through the membrane. This method is readily added to a distillation process by connecting a vapour stream, for example, in the head of a distillation column directly to a vapour permeation module. Azeotropic mixtures are often the product of distillation, so that direct coupling of vapour permeation can, furthermore, be used to completely dehydrate azeotropic mixtures of alcohols and water. In principle, the same membranes can be used in this process as in pervaporation. Of course, in dehydration by means of pervaporation or vapour permeation, the flux, i.e. the mass of water which can be removed from the mixture per unit area of membrane and per unit time, is an important economic factor. The flux is determined by the product of the solubility and the rate of diffusion of the vapour in the membrane.

In known pervaporation processes and also in vapour permeation, the flux is low (usually $<1$ kg/m$^2$h).

Surprisingly, it has been found that the flux can be increased appreciably by impregnating the membrane beforehand with a hygroscopic electrolyte.

The requirements which have to be imposed on the substance to be impregnated are that it does not adversely affect the selectivity of the membrane and it is not volatile. Although hygroscopic organic components, such as polyols and the like, increase the flux when added to a membrane (for example, a cellulose membrane), the selectivity is poor. The said hygroscopic electrolytes increase the flux by a factor of 2 to 5, but do not have any adverse effect on the selectivity.

Impregnation is simple: the membrane is placed in a solution of the electrolyte concerned for one to five hours. The concentration of the solution may be between 5% and saturation of the solution.

The invention also relates to a membrane for the removal of water vapour from a gas/vapour mixture by means of vapour permeation. According to the invention, the membrane is impregnated with a hygroscopic electrolyte.

Preferably, the electrolyte is a salt of an alkali metal, an alkaline-earth metal or a transition metal. In particular, the metals lithium, sodium, potassium, magnesium and calcium are available, but also other metals from the groups named. The salt is preferably a chloride, bromide, fluoride, sulphate or nitrate.

Preferably, the choice is for a salt whose saturated solution in water has a vapour tension which is lower than the partial water vapour tension of the mixture to be dehydrated.

Salts such as LiBr, KCl, MgCl$_2$, CaCl$_2$, SrSO$_4$ and NaNO$_3$ are found to give an excellent result. All the salts which are readily soluble in water and have hygroscopic properties are capable in principle of producing satisfactory results.

EXAMPLE

A regenerated cellulose membrane with a thickness of 50 um is placed in a measuring cell. A vapour mixture composed of 4% by weight of water and 96% ethanol is passed along one side of the membrane at a pressure of 1 bar. The temperature of the vapour is 86° C. A pressure of approx. 0.001 bar is applied to the other side of the membrane. Under these conditions, virtually only water permeates through the membrane. The water vapour is condensed in a cooling vat. The water flux observed under these conditions is approx. 0.02 kg/m$^2$h.

A membrane as referred to in the experiment cited above is placed in an aqueous solution of lithium bromide and kept therein for 2-5 hours. Subsequently, the membrane thus impregnated is placed in a measuring cell and the water flux is again determined for ethanol/water vapour under conditions which are identical to those of the preceding experiment. The water flux observed for said membrane is initially 0.1 kg/m$^2$h, but drops thereafter to a value of 0.05 kg/m$^2$h which is stable with time. A flux increase, therefore, by a factor of 2.5 with respect to an untreated membrane.

Flux increases of a factor of 2-3 are also obtained if the impregnation takes place of an alcoholic solution of lithium bromide or another hygroscopic salt.

We claim:

1. Membrane for removing water vapour from a gas/vapour mixture by means of vapour permeation, comprising: a hygroscopic electrolyte of a dryness sufficient to increase the flux of said membrane by a factor of up to about 5.

2. Membrane according to claim 1, characterized in that the electrolyte is a salt of an alkali metal, an alkaline-earth metal or a transition metal from the periodic system.

3. Membrane according to claim 2, characterized in that the salt is a chloride, bromide, fluoride, sulphate or nitrate.

* * * * *